United States Patent [19]

Everman

[11] Patent Number: 4,782,865

[45] Date of Patent: Nov. 8, 1988

[54] BOX FILLING APPARATUS

[75] Inventor: Wayne F. Everman, Cedar Falls, Iowa

[73] Assignee: Container Corporation of America, Alton, Ill.

[21] Appl. No.: 67,533

[22] Filed: Jun. 29, 1987

[51] Int. Cl.4 .......................... B65B 1/28; B65B 1/32
[52] U.S. Cl. ........................................ 141/83; 141/73; 141/114; 141/168; 177/DIG. 11; 198/505; 222/77
[58] Field of Search .............................. 141/83, 71–78, 141/80, 1, 12, 114, 168, 138, 140; 198/504, 505, 855, 609; 53/502; 177/DIG.11, 119, 120, 121, 124; 222/77

[56] References Cited

U.S. PATENT DOCUMENTS

| | | | |
|---|---|---|---|
| 2,555,688 | 6/1951 | Flam | 141/74 X |
| 2,596,824 | 5/1952 | Scott | 141/72 X |
| 2,808,081 | 10/1957 | Orsini et al. | 141/72 |
| 3,162,218 | 12/1964 | Casey, Jr. | 141/72 |
| 3,336,955 | 8/1967 | Feldman et al. | 141/72 |
| 3,578,094 | 5/1971 | Henry et al. | 198/505 X |
| 3,805,905 | 4/1974 | McClusky | 177/DIG. 11 X |
| 3,990,212 | 11/1976 | Flodin | 141/83 X |
| 4,010,595 | 3/1977 | Boyd | 141/83 X |
| 4,055,203 | 10/1977 | Crawford et al. | 141/73 |
| 4,182,383 | 1/1980 | Adomitis et al. | 141/83 X |
| 4,193,430 | 3/1980 | James, Jr. et al. | 141/12 |
| 4,241,769 | 12/1980 | Wiesner | 141/83 |
| 4,554,868 | 11/1985 | Zimmer | 141/73 X |

FOREIGN PATENT DOCUMENTS

1549790  8/1979  United Kingdom ................ 141/83

*Primary Examiner*—Henry J. Recla
*Assistant Examiner*—Ernest G. Cusick
*Attorney, Agent, or Firm*—Richard W. Carpenter

[57] ABSTRACT

Apparatus for simultaneously vibrating and weighing a bulk container, as it is being filled, and for automatically modulating the intensity of the vibrating motion during the filling operation as is being filled, to insure complete settling and compaction of the product without having product spilled out of the container by excessive vibration, especially during the latter stages of the filling operation.

9 Claims, 7 Drawing Sheets

BOX FILLING APPARATUS

BACKGROUND OF THE INVENTION

1. Field of the Invention:

This invention relates generally to filling apparatus for bulk shipping containers and more particularly to apparatus for simultaneously filling and settling the contents in a bulk container by the use of coordinated vibrating and weighing mechanisms.

2. Description of the Prior Art:

The prior art search directed to the subject matter of this application in the United States Patent and Trademark Office disclosed the following U.S. Pat. Nos.: 2,071,443; 2,258,182; 2,598,494; 2,614,786; 2,626,042; 2,644,661; 2,981,349; 3,117,639; 3,696,584; 3,805,905; 4,027,735; 4,513,882.

None of the prior art patents uncovered in the search discloses apparatus for filling bulk boxes which includes equipment for simultaneously weighing and shaking the contents of the box, wherein the intensity of the shaking is adjusted automatically as the box is being filled, and also wherein the side walls of the box are simultaneously clamped into squared vertical position to prevent bulging of the box.

SUMMARY OF THE INVENTION

It is an object of the present invention to provide apparatus for simultaneously vibrating and weighing the contents of a bulk shipping container as it is being filled to insure that the material in the box is settled and compacted as much as possible, so that the weight of the box contents is accurately maintained.

Another object of the invention is the provision for clamping the side walls of a bulk shipping container to maintain them in squared vertical position and prevent them from being deflected outwardly as the container is being filled.

A more specific object of the invention is the provision, in filling apparatus of the type described, of mechanisms for simultaneously vibrating the contents of a box as it is being weighed and for automatically adjusting the degree or intensity of the vibration as the box is being filled.

These and other objects of the invention will be apparent from an examination of the following description and drawings:

It will be understood that, for purposes of clarity, certain elements may have been intentionally omitted from certain veiws where they are believed to be illustrated to better advantage in other views.

DESCRIPTION OF THE PREFERRED EMBODIMENT

The present invention relates to device or apparatus for simultaneously filling, settling, and weighing the contents of bulk boxes. A box B on a pallet P resting on a conveyor is restrained to prevent the movement off of the conveyor during the vibrating program. The vibrator drive is modulated during the fill cycle according to the amount of material in the box to optimize the settling action. The amount of material is determined by scale weight and is automatically sent to the vibrator drive as a speed signal.

Laboratory fill stations have been used in the past to compact and consolidate bulk materials. This results in better utilization of box volume and shipping volume. The vibrated material is more uniformly distributed, so that box stacking performance is not adversely affected by uneven settling after filling.

One problem with existing systems is that, if aggresive vibratory settling is applied, the box B will frequently shift on the pallet P on the conveyor and, in some cases, "walk" off the conveyor. When the vibration is reduced to avoid box shifting sometimes the contents are not adequately settled.

Also, when the box fill is near completion, aggressive vibration can result in the material being thrown over the box sides.

The fill apparatus of the present invention avoids these problems by modulating the vibration frequency during the fill cycle and also provides box and pallet restraint as an integral part of the vibratory mechanism.

Figure 1:
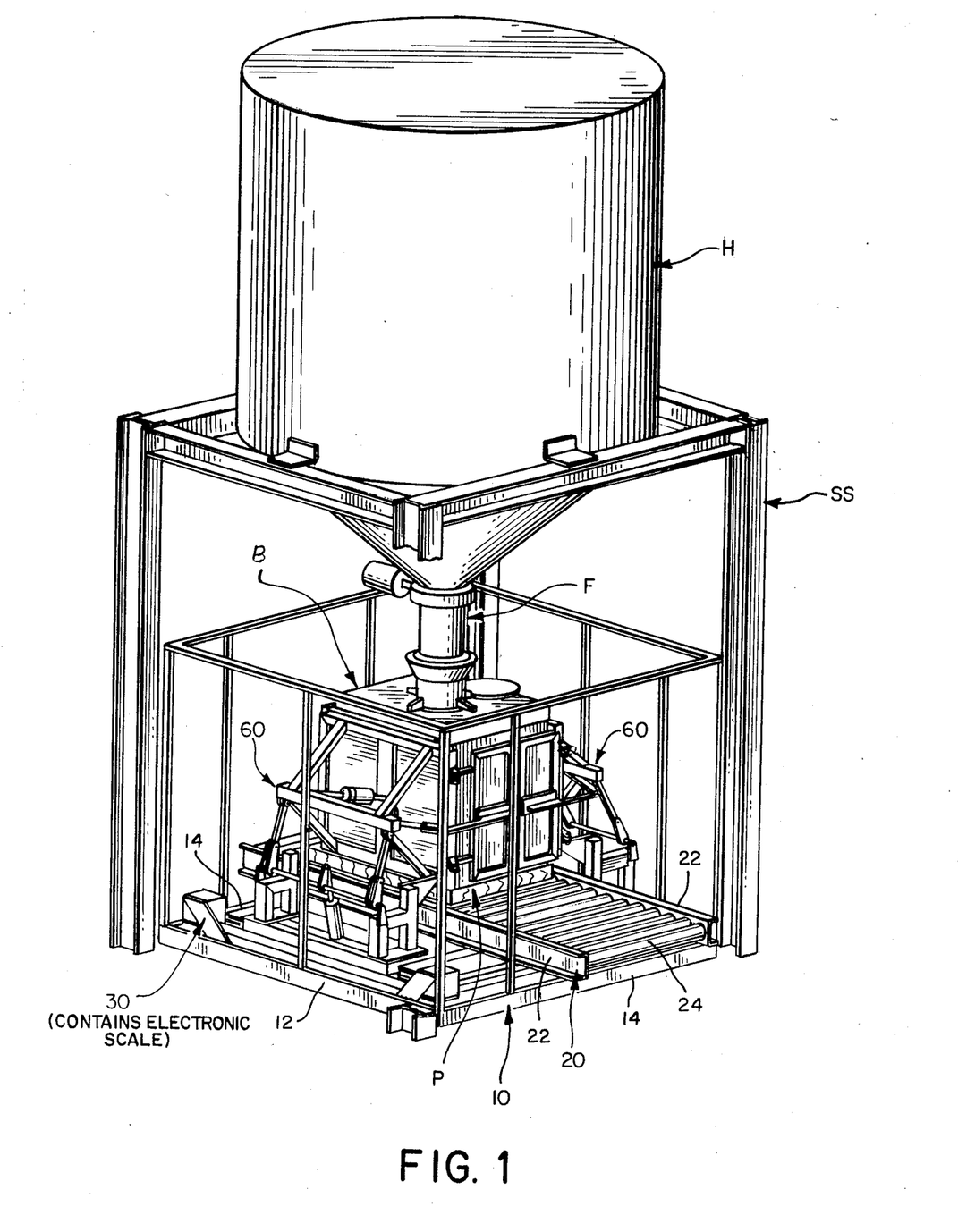
FIG. 1 is a fragmentary isometric view of a station in a bulk container filling line which includes filling apparatus of the present invention as well as related equipment used in the formation and filling of the container.

Referring now to the drawings for a better understanding of the invention, and particularly to FIG. 1, it will be seen that the apparatus embodying features of the present invention is included as part of an overall box filling station which includes an outer frame or super structure indicated generally at SS. The actual apparatus of the present invention is mounted on a sub-frame structure or base indicated generally at 10.

Mounted on the super structure SS is a pouring spout filling mechanism, indicated generally at F, the details of which are not shown, because the specific filling apparatus does not form part of the present invention.

The filling apparatus is primarily designed to fill a bulk shipping container or box indicated generally at B with granular powdered or other material from a product hopper indicated generally at H.

Figure 3:
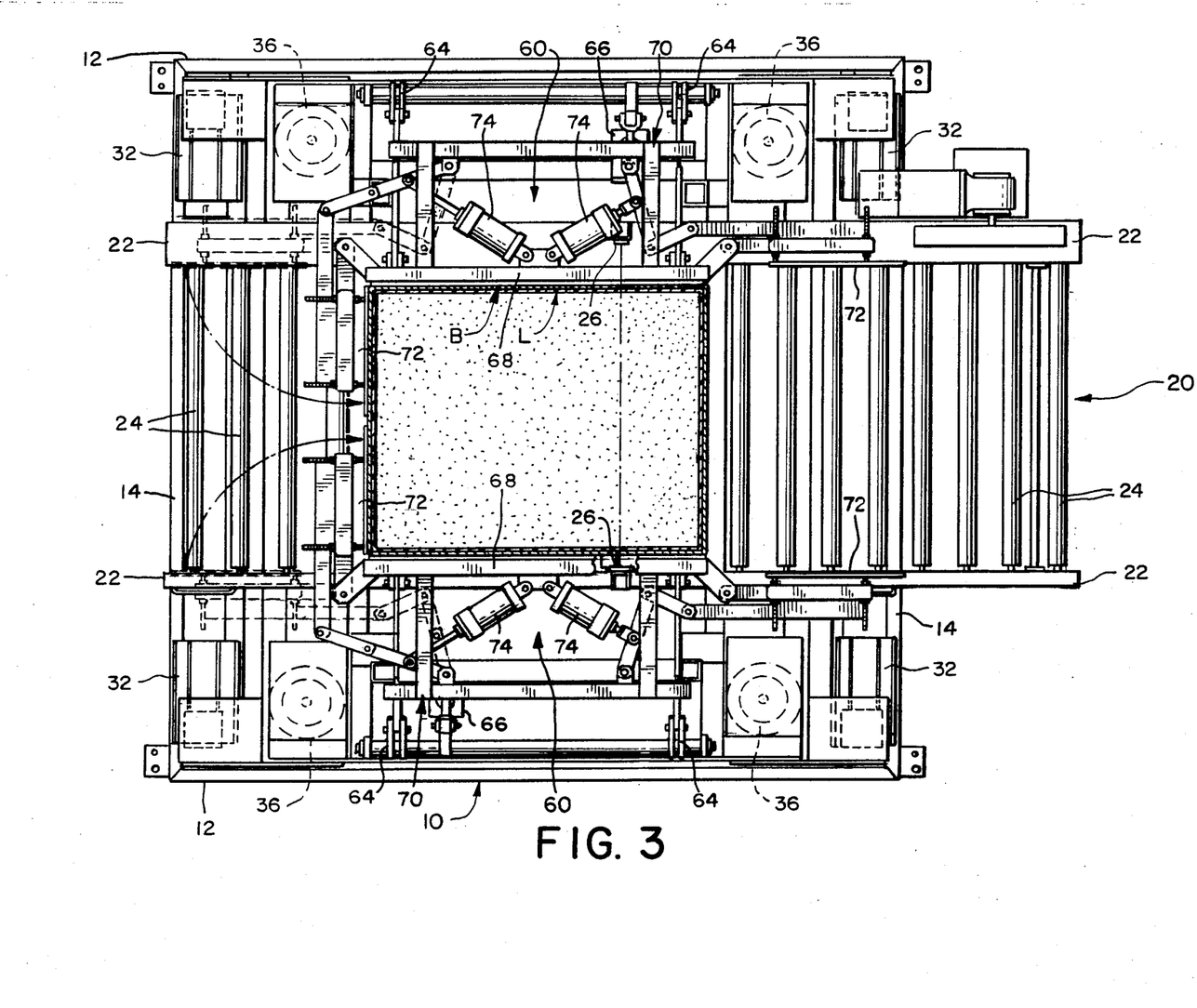
FIG. 3 is a fragmentary top plan view of the structure illustrated in FIG. 2.

The box B may be formed of one or more plies of corrugated paperboard material and has a separate plastic liner, indicated generally at L in FIG. 3, which may be formed and inserted into the box B by a liner forming and inserting mechanism.

The box is positioned on a pallet P which moves into and out of the filling station on a conventional horizontal roller conveyor assembly indicated generally at 20.

Figure 2:
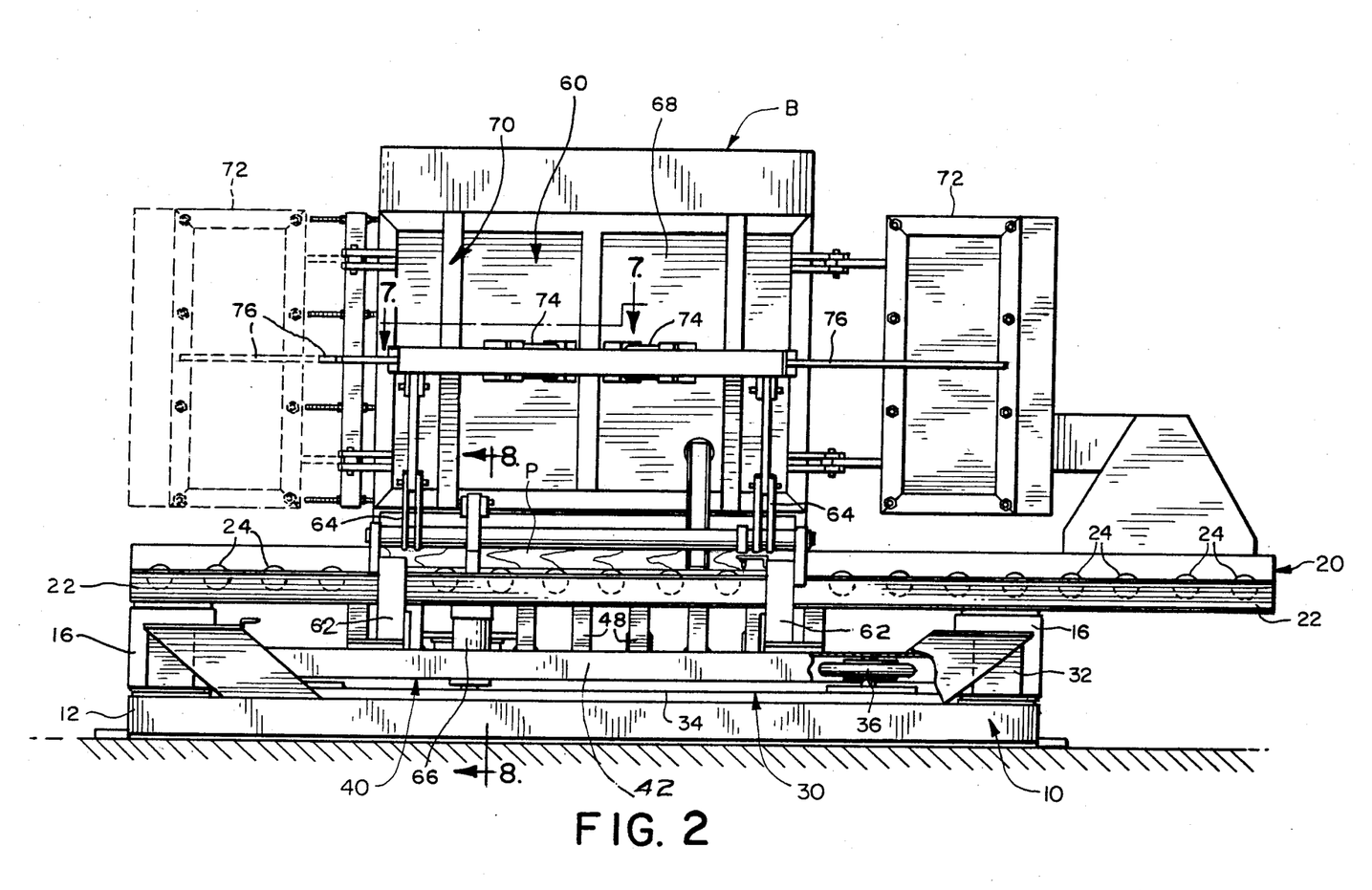
FIG. 2 is a fragmentary side elevational view of a portion of the filling apparatus embodying features of the present invention.
Figure 4:
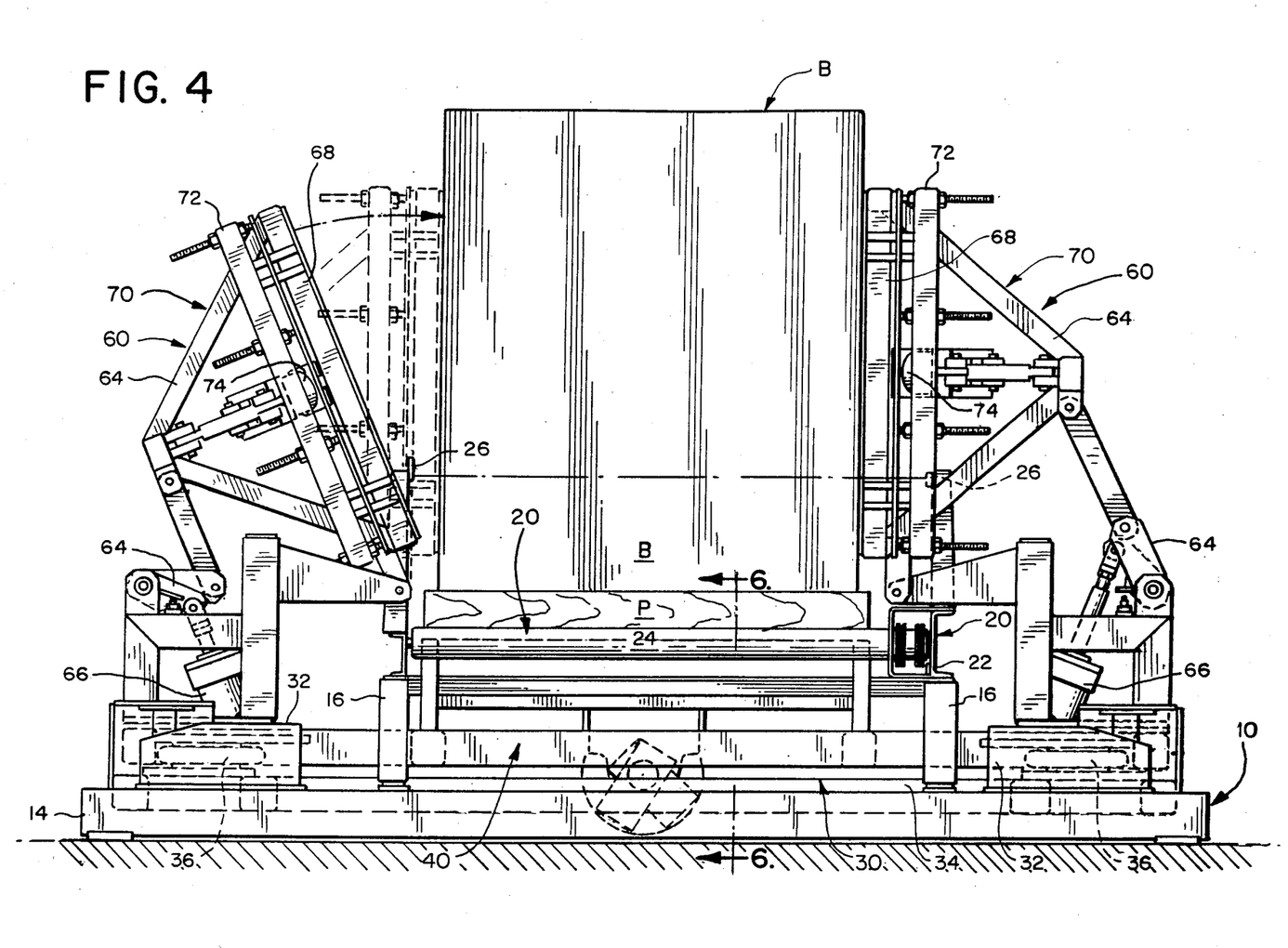
FIGS. 4 and 5 are fragmentary end elevations of the structure illustrated in FIG. 2.
Figure 5:
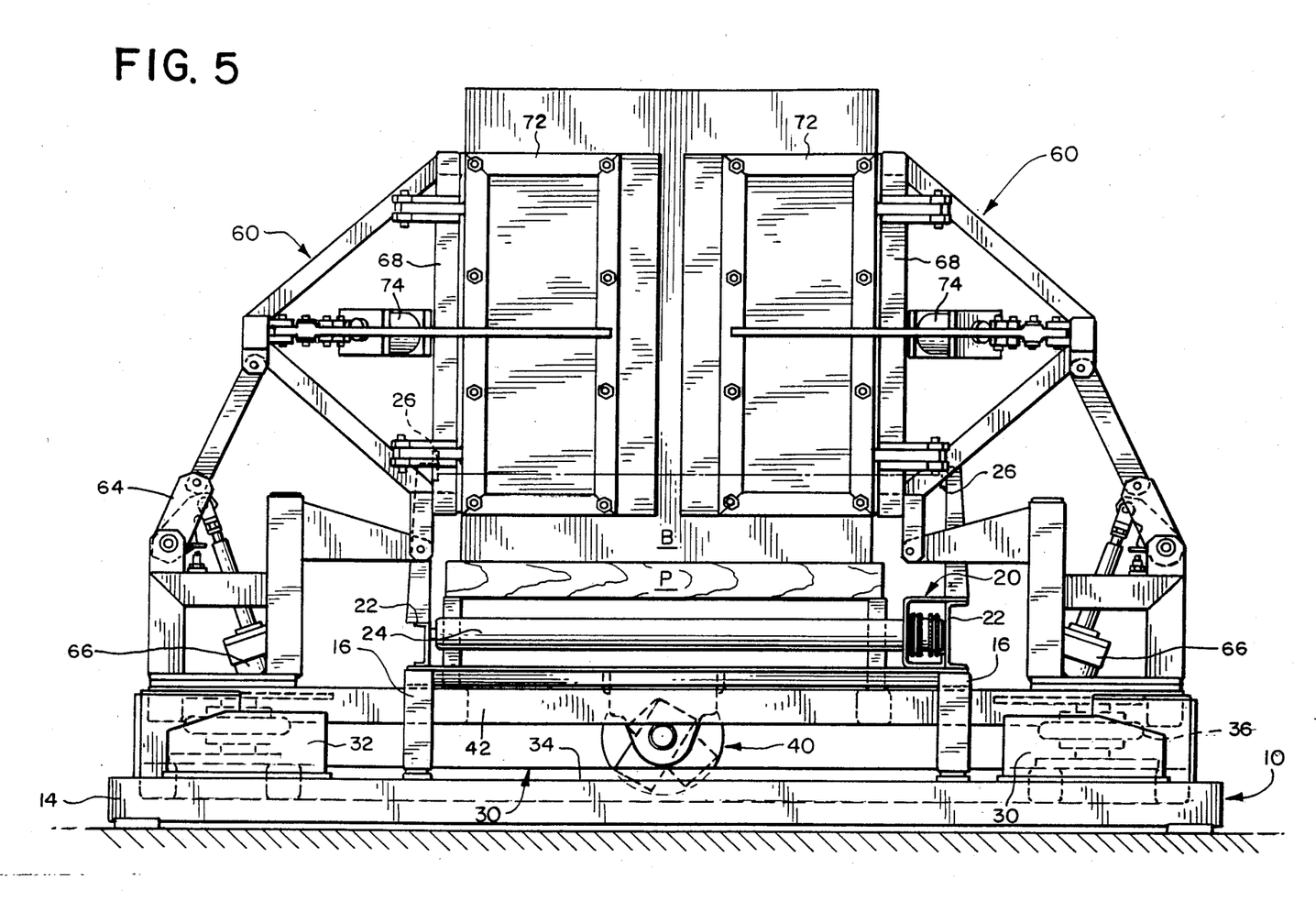

As best seen in FIGS. 2, 4, and 5, the base 10, on which the novel apparatus of the present invention is mounted, includes a pair of longitudinally extending members 12, adapted to rest on a floor or deck, and at least another pair of transversely extending members 14 joined to the longitudinal members to form a generally rectangular structure. Projecting upwardly from the longitudinal and transverse members are a plurality of vertical members 16 which, as best seen in FIGS. 4 and 5, support a generally horizontally disposed conveyor assembly indicated generally at 20.

As best seen in FIGS. 2,4, 5 and 6, the conveyor assembly 20 includes a pair of longitudinally extending, transversely spaced rails 22 between which extend a plurality of longitudinally spaced transversely extending rollers 24.

Still referring to FIG. 2, it will be seen that the box shaking mechanism or vibrator assembly 40 is supported by a weighing device or scale assembly 30, which in turn is supported by the base 10.

Scale assembly 30 includes a platform 34, the corners of which are carried by four preferably strain gauge type load cells 32 supported on base 10.

The vibrator assembly 40 also includes a deck or grid frame 42 which is supported at its corners by inflatable air bags 36 mounted on the scale plateform 34.

Vibrator assembly 40 includes a grid of projections 48 which extend upwardly from deck 42 for contact with a box or pallet when the deck is in its uppermost or pallet contacting position.

Vertical movement of deck 42, with its integral projections 48, is accomplished by the air bag devices 36. When the bags are inflated the deck is moved upwardly; when deflated the deck is lowered.

Vibration of the deck 42 and projections 48 is accomplished by a mechanism which includes a vibrator shaft 44 mounted to the underside of deck 42 by one or more pillow blocks 43. Secured to the vibrator shaft 44 are eccentric weights 45 and a motor 46, which rotates the shaft. The eccentric weights cause the deck and integral projections 48 to shake.

Figure 6:
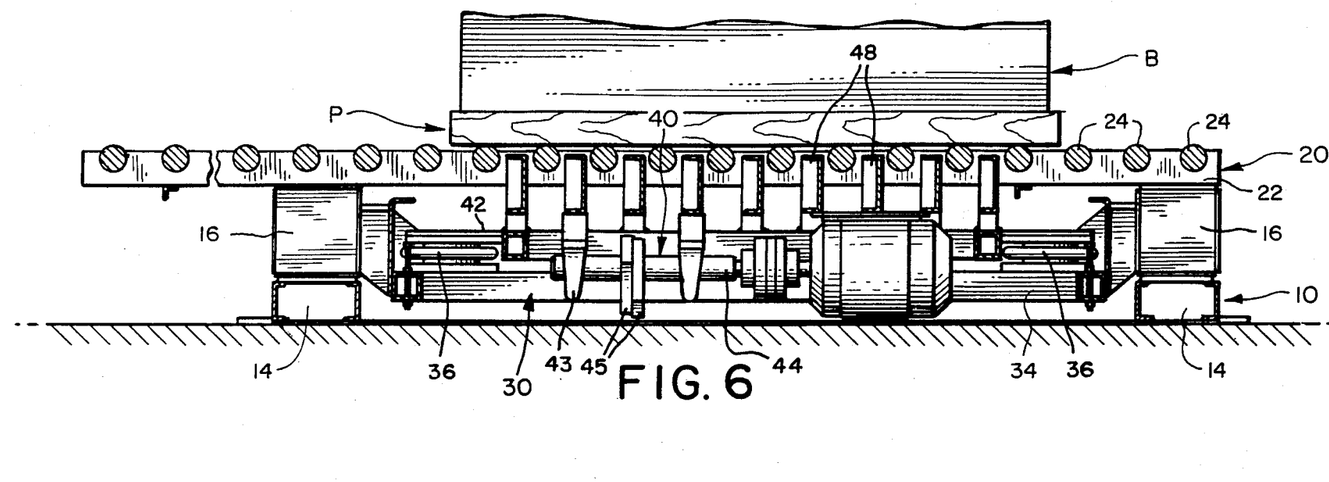
FIG. 6 is a fragmentary sectional view taken on line 6—6 of FIG. 4, showing the vibrating mechanism of the present invention positioned out of contact with a box holding pallet.
Figure 6A:
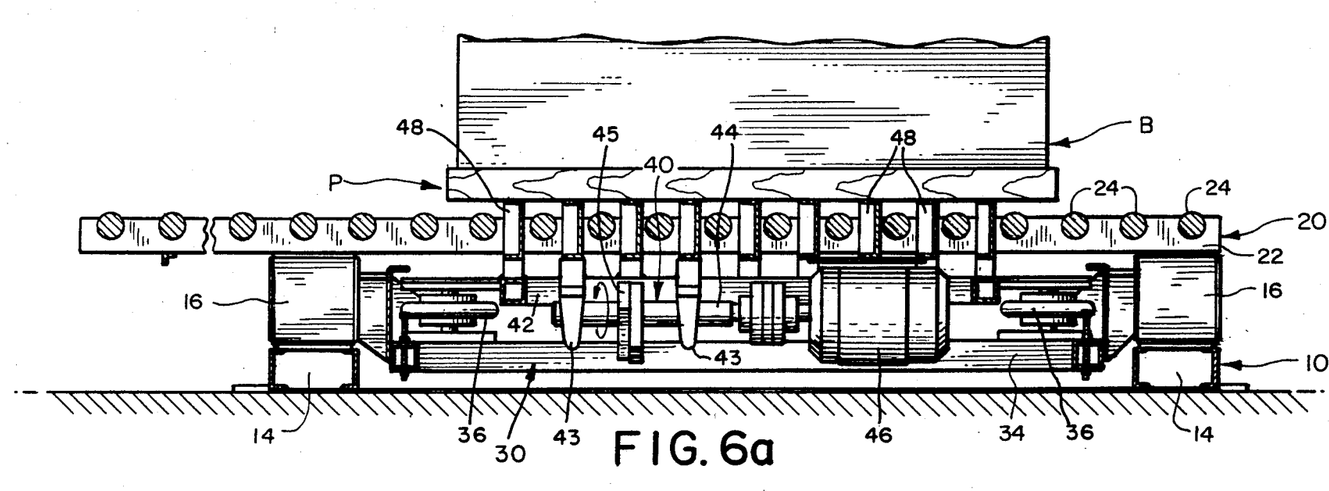
FIG. 6a is a view similar to FIG. 6, but showing the box vibrating mechanism positioned for contact with a pallet.

The extensions 48 are positioned alternately with respect to the rollers 24 of the conveyor assembly 20, so that when the extensions 48 are moved upwardly they are free to pass between the rollers of the conveyor and engage the underside of pallet P on which box B is resting, as shown in FIG. 6a of the drawings. In FIG. 6 of the drawings the extensions 48 are in the lower or non-engaging position.

In addition to the box vibrating assembly previously described, the apparatus of the present invention also includes a clamping assembly indicated generally at 60, and best illustrated in FIGS. 2-5.

The purpose of the clamping assembly is to square up the box and maintain the side walls of the box in a perfectly vertical position, as the box is being filled, to prevent the walls from being deflected outwardly. The clamping assembly also keeps the box in position and prevents it from "walking" off the pallet P as it is being vibrated.

Clamping assembly 60 includes pairs of upper frames 70 and lower frames 62 which are interconnected by a plurality of links 64. Each upper frame 70 is adapted for movement in a vertical plane, and the movement is effected by a related fluid cylinder 66 mounted on related lower frame 62.

As best seen in FIG. 4, upper frames 70 are disposed on opposite sides of the box, and each upper frame includes a pressure plate 68 adapted to press against the related side wall of the box to keep it from bulging as it is being filled. Still referring to FIG. 4, it will be seen that on the left side of the view the plate 68 is shown in the non-engaging position; whereas, on the right side of view plate 68 is shown in the box engaging position.

Each of the upper frames 70 also carries a pair of plates 72 for engaging portions of the front and rear end walls of the box, as well as mechanism for moving the plates toward and away from the box.

Figure 7:
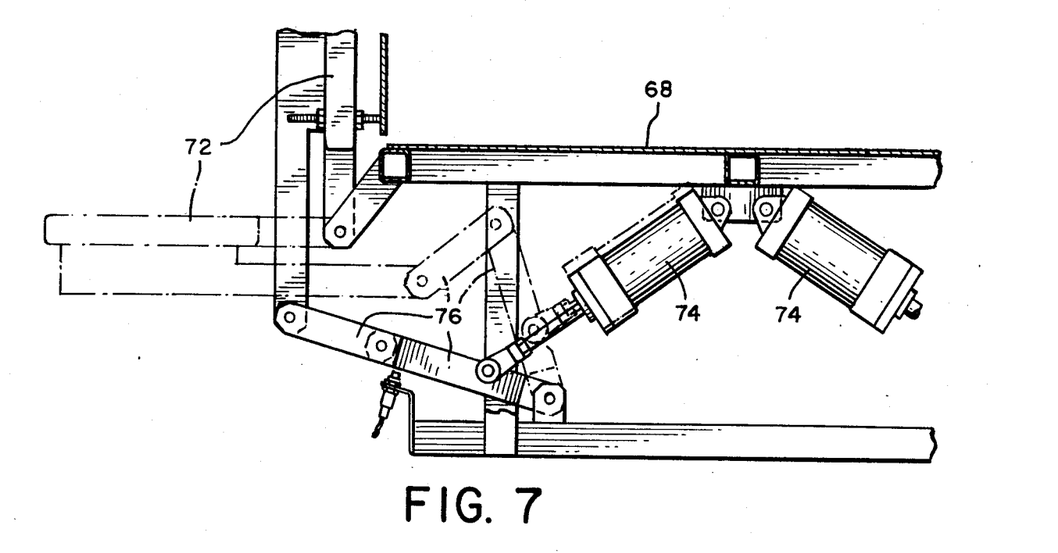
FIG. 7 is enlarged top plan view of a portion of the linkage illustrated in FIG. 3.
Figure 8:
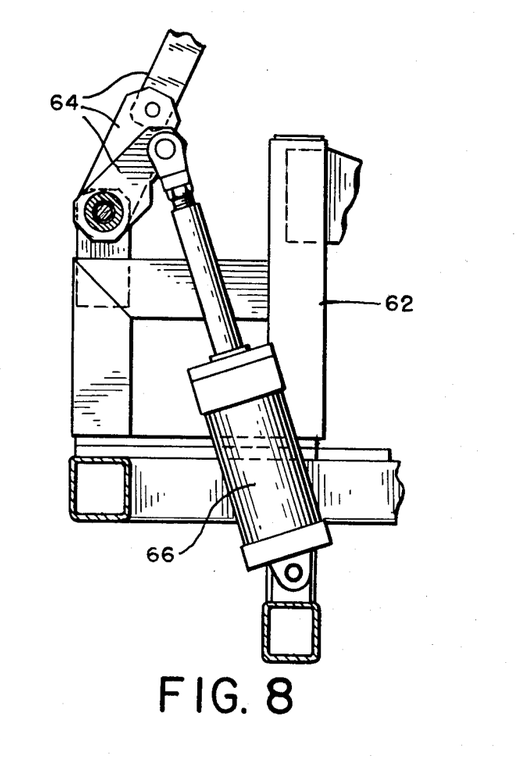
FIG. 8 is an enlarged side elevationsl view of a portion of the linage illustrated in FIG. 4.
Figure 8A:
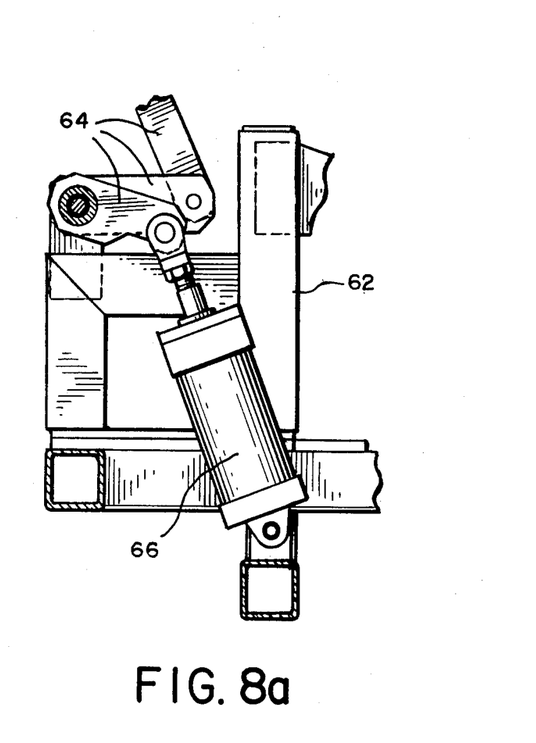
FIG. 8a is a view similar to FIG. 8, but showing the apparatus in a different operating position.

Each pair of plates 72 carried by one of the frames 70 is actuated by a pair of fluid cylinders 74 mounted on the upper frames 70 and connected to the respective plates by means of linkage 76 which is shown in detail in FIG. 7 of the drawings.

Now to describe the operation of the device, as a bulk box B on a pallet P moves along the conveyor assembly 20 it is delivered to the fill station embodying features of the present invention. The box advances until it blocks a photoelectric cell 26 which signal the conveyor to stop.

The air mount isolators 36, which are in the form of inflatable bags mounted at the four corners of the device, are then inflated, and the and the vibratory deck 42 and extensions 48 move upwardly between the conveyor rolls to engage the underside of the box, or the pallet supporting the box, and lift it off the conveyor.

If the equipment includes the box side wall clamping mechanism previously described, the box clamps are moved by their respective actuating cylinders to secure the box during the vibration. The securement of the box not only prevents the box "walking" off of the conveyor, but it also prevents side walls of the box from bulging outwardly as the box is filled.

At this point the box, pallet, and entire vibratory assembly 40 are now supported by the scale platform.

The scale performs a dual function by signaling the customer's product valve to open and also signaling the vibratory mechanism to commence vibrating the box and contents thereby causing the settling and compaction of the product as the box is being filled.

The vibration frequency is determined experimentally to optimize settling action for the various stages of the fill cycle with respect to any particular product. At pre-determined fill weights the speed of the vibratory motor is modulated, according to a prescribed program. A cut-off signal is provided near the end of the fill cycle to cease the vibration for accurate weighing.

This signal can also actuate a dribble feed, if the customer's product delivery is so equipped. When the pre-determined product weight is reached the scale signals the product valve to close. The machine can be programed for optional vibration cycle after completion of the fill cycle.

If the optional box clamps are provided, they are released at completion of the last vibration cycle.

The air mount isolators 36 are then deflated, to lower the filled box back onto the powered conveyor assembly rollers.

As the conveyor starts transporting the filled box out of the filled area and on to subsequent operations, the fill station is ready to receive the next box moving along the conveyor into the fill station.

The filling cycle time is dependent on several variable factors including the customer's product delivery rate, the amount of reserve volume of the box, the rate of compaction for the specific material, and the rate in which the box may receive product without experiencing structural damage. Cycle time may also be affected by desired fill weight accuracy, as the amount of material in suspension at scale cutoff is the function of the fill, or dribble rate.

Varying the intensity of the vibration as the box is being filled can be accomplished by having in the scale assembly 30 an electronic scale (not shown) which is equipped with an electronic processor (not shown) which is connected to the variable speed motor 46 of the vibrating assembly 40. The details of the scale and processor are not shown, as the are available commercially and are not part of the present invention. As the accumulating weight reaches each of various preselected cut-off values, signals are sent by the processor to the motor to cause it to change its rate of speed as required.

The clamping mechanism, when used, helps prevent the box from sustaining structural damage as it is being filled.

Thus it will be appreciated that the invention provides apparatus for protecting the integrity of the box and compacting the material and weighing, it as it is being filled, to obtain an accurately filled container, with the material being compacted so as to optimize the use of the space in the container.

What is claimed is:

1. Apparatus for simultaneously weighing and vibrating the contents of a multi-sided box, standing alone or supported on a pallet, as the box is filled from a filling means, said apparatus comprising:
   (a) a base;
   (b) at least one scale load cell supported by said base;
   (c) a scale platform supported by said at least one load cell;
   (d) a conveyor supported by said base independently of said at least one load cell and including a pair of spaced parallel rails and a plurality of rollers extending between said rails;
   (e) a box vibrating assembly supported by said scale platform and including:
      (i) a vibrating frame positioned under said conveyor and having portions capable of being moved vertically between the rollers of said conveyor for engagement with the underside of said box, or box supporting pallet, positioned on said conveyor;
      (ii) mechanism carried by said frame for vibrating said box as said box is being filled;
      (iii) means for varying the intensity of the vibration of said box with the changing weight of the contents as the box is being filled, as determined by said at least one load cell;
      (iv) box clamping means movable into and out of engagement with all sides of said box to prevent said sides from bulging as the box is being filled;
   (f) said clamping means including:
      (i) a lower frame section mounted on said base;
      (ii) a pair of upper frame sections pivotally connected to said lower frame section on opposite sides of said conveyor;
      (iii) said upper frame sections each including a box side wall engaging plate and each being mounted for movement in a vertical plane between side wall engaging and non-engaging positions;
   (g) means for supporting said vibrating frame on said base and for moving said vibrating frame portions upwardly through said conveyor.

2. Apparatus according to claim 1, wherein each of said upper frame sections includes a pair of front and rear end wall engaging plates mounted for movement in a horizontal plane between end wall engaging and non-engaging positions.

3. Apparatus for simultaneously weighing and vibrating the contents of a multisided box, standing alone or supported on a pallet, as the box is filled from a filling means, said apparatus comprising:
   (a) a base;
   (b) at least one scale load cell supported by said base;
   (c) a scale platform supported by said at least one load cell;
   (d) a conveyor supported by said base independently of said at least one load cell and including a pair of spaced parallel rails and a plurality of rollers extending between said rails;
   (e) a box vibrating assembly supported by said scale platform and including:
      (i) a vibrating frame positioned under said conveyor and having portions capable of being moved vertically between the rollers of said conveyor for engagement with the underside of said box, or box supporting pallet, positioned on said conveyor;
      (ii) mechanism carried by said frame for vibrating said box as said box is being filled;
      (iii) means for varying the intensity of the vibration of said box with the changing weight of the contents as the box is being filled, as determined by said at least one load cell;
      (iv) box clamping means movable into and out of engagement with all sides of said box to prevent said sides from bulging as the box is being filled;
   (f) at least one inflatable air bag interposed between said scale platform and said vibrating frame for resiliently supporting said vibrating frame on said base and for moving said vibrating frame portions upwardly through said conveyor.

4. Apparatus for simultaneously weighing and vibrating the contents of a multisided box, standing alone or supported on a pallet, as the box is filled from a filling means, said aparatus comprising:
   (a) a base;
   (b) at least one scale load cell supported by said base;
   (c) a scale platform supported by said at least one load cell;
   (d) a conveyor supported by said base independently of said at least one load cell and including a pair of spaced parallel rails and a plurality of rollers extending between said rails;
   (e) a box vibrating assembly supported by said scale platform and including:
      (i) a vibrating frame positioned under said conveyor and having portions capable of being moved vertically between the rollers of said conveyor for engagement with the underside of said box, or box supporting pallet, positioned on said conveyor;
      (ii) mechanism carried by said frame for vibrating said box as said box is being filled;
      (iii) means for varying the intensity of the vibration of said box with the changing weight of the contents as the box is being filled, as determined by said at least one load cell;
      (iv) box clamping means movable into and out of engagement with all sides of said box to prevent said sides from bulging as the box is being filled;
   (f) said clamping means including:

(i) a pair of opposed side wall engaging plates movable in a vertical plane between engaging and non-engaging positions;

(ii) pairs of opposed front and rear end wall engaging plates movable in a horizontal between engaging and non-engaging positions;

(g) means for supporting said vibrating frame on said base and for moving said vibrating frame portions upwardly through said conveyor.

5. Apparatus for simultaneously weighing and vibrating the contents of a multi-sided box, standing alone or supported on a pallet, as the box is filled from a filling means, said apparatus comprising:

(a) a base;

(b) at least one scale load cell supported by said base;

(c) a scale platform supported by said at least on load cell;

(d) a conveyor supported by said base independently of said at least one load cell and including a pair of spaced parallel rails and a plurality of rollers extending between said rails;

(e) a box vibrating assembly supported by said scale platform and including:

(i) a vibrating frame positioned under said conveyor and having portions capable of being moved vertically between the rollers of said conveyor for engagement with the underside of said box, or box supporting pallet, positioned on said conveyor;

(ii) mechanism carried by said frame for vibrating said box as said box is being filled;

(iii) means for varying the intensity of the vibration of said box with the changing weight of the contents as the box is being filled, as determined by said at least one load cell;

(iv) box clamping means movable into and out of engagement with all sides of said box to prevent said sides from bulging as the box is being filled;

(f) said clamping means including a pair of opposed side wall engaging plates movable in a vertical plane between engaging and non-engaging positions;

(g) means for supporting said vibrating frame on said base and for moving said vibrating frame portions upwardly through said conveyor.

6. Apparatus for simultaneously weighing and vibrating the contents of a multi-sided box, standing alone or supported on a pallet, as the box is filled from a filling means, said apparatus comprising:

(a) a base;

(b) at least one scale load cell supported by said base;

(c) a scale platform supported by said at least one load cell;

(d) a conveyor supported by said base independently of said at least one load cell and including a pair of spaced parallel rails and a plurality of rollers extending between said rails;

(e) a box vibrating assembly supported by said scale platform and including:

(i) a vibrating frame positioned under said conveyor and having portions capable of being moved vertically between the rollers of said conveyor for engagement with the underside of said box, or box supporting pallet, positioned on said conveyor;

(ii) mechanism carried by said frame for vibrating said box as said box is being filled;

(iii) means for varying the intensity of the vibration of said box with the changing weight of the contents as the box is being filled, as determined by said at least one load cell;

(f) means for supporting said vibration frame on said base and for moving said vibrating frame portions upwardly through said conveyor;

(g) said means for supporting said vibrating frame on said scale platform and for moving said vibrating frame portions vertically including inflatable cushion devices.

7. Apparatus for simultaneously weighing and vibrating the contents of a multi-sided box, standing alone or supported on a pallet, as the box is filled from a filling means, said apparatus comprising:

(a) a base;

(b) at least one scale load cell supported by said base;

(c) a scale platform supported by said at least one load cell;

(d) a conveyor supported by said base independently of said at least one load cell and including a pair of spaced parallel rails and a plurality of rollers extending between said rails;

(e) a box vibrating assembly supported by said scale platform and including:

(i) a vibrating frame postioned under said conveyor and having portions capable of being moved vertically between the rollers of said conveyor for engagement with the underside of said box, or box supporting pallet, positioned on said conveyor;

(ii) mechanism carried by said frame for vibrating said box as said box is being filled;

(iii) means for varying the intensity of the vibration of said box with the changing weight of the contents as the box is being filled, as determined by said at least one load cell;

(f) means for supporting said vibrating frame on said base and for moving said vibrating frame portions upwardly through said conveyor;

(g) said vibrating frame being supported on said scale platform by inflatable air mounts which when inflated move said frame upwardly and when deflated move said frame downwardly.

8. Apparatus for simultaneously weighing and vibrating the contents of a multi-sided box, standing alone or supported on a pallet, as the box is filled from a filling means, said apparatus comprising:

(a) a base;

(b) at least one scale load cell supported by said base;

(c) a scale platform supported by said at least one load cell;

(d) a conveyor supported by said base independently of said at least one load cell and including a pair of spaced parallel rails and a plurality of rollers extending between said rails;

(e) a box vibrating assembly supported by said scale platform and including:

(i) a vibrating frame positioned under said conveyor and having portions capable of being moved vertically between the rollers of said conveyor for engagement with the underside of said box, or box supporting pallet, positioned on said conveyor;

(ii) mechanism carried by said frame for vibrating said box as said box is being filled;

(iii) means for varying the intensity of the vibration of said box with the changing weight of the contents as the box is being filled, as determined by said at least one load cell;
(f) means for supporting said vibrating frame on said base and for moving said vibrating frame portions upwardly through said conveyor;
(g) said means for varying the intensity of the vibration of said box including:
  (i) a variable speed motor operatively connected to said vibrating mechanism;
  (ii) an electronic scale connected to said scale platform and operative to send electrical signals to said variable speed motor, as preset weight levels are sensed.

9. Apparatus for simultaneously weighing and vibrating the contents of a multi-sided box, standing alone or supported on a pallet, as the box is filled from a filling means, said apparatus comprising:
(a) a base;
(b) at least one scale load cell supported by said base;
(c) a scale platform supported by said at least one load cell;
(d) a conveyor supported by said base independently of said at least one load cell and including a pair of spaced parallel rails and a plurality of rollers extending between said rails;
(e) a box vibrating assembly supported by said scale platform and including:
  (i) a vibrating frame positioned under said conveyor and having portions capable of being moved vertically between the rollers of said conveyor for engagement with the underside of said box, or box supporting pallet, positioned on said conveyor;
  (ii) mechanism carried by said frame for vibrating said box as said box is being filled;
  (iii) means for varying the intensity of the vibration of said box with the changing weight of the contents as the box is being filled, as determined by said at least one load cell;
(f) at least one inflatable air bag interposed between said scale platform and said vibrating frame for resiliently supporting said vibrating frame on said base and for moving said vibrating frame portions upwardly through said conveyor.

* * * * *